April 6, 1948.  J. F. KENDRICK  2,439,253
SELF-LOCKING NUT
Filed Oct. 2, 1943
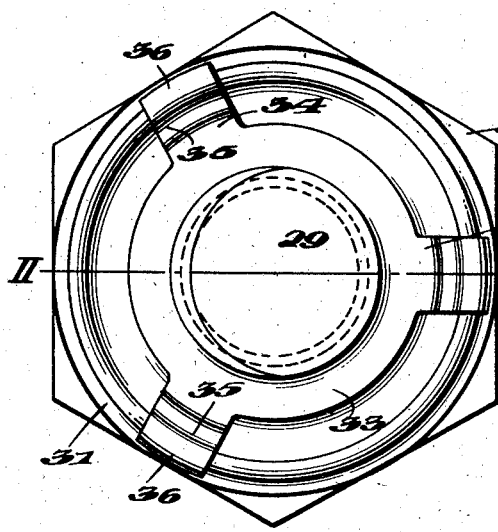
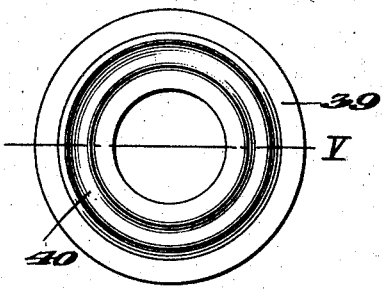
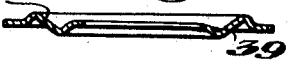
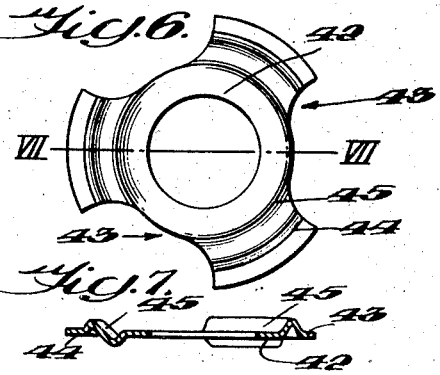
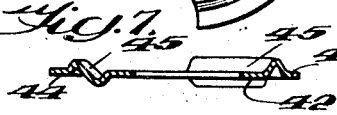
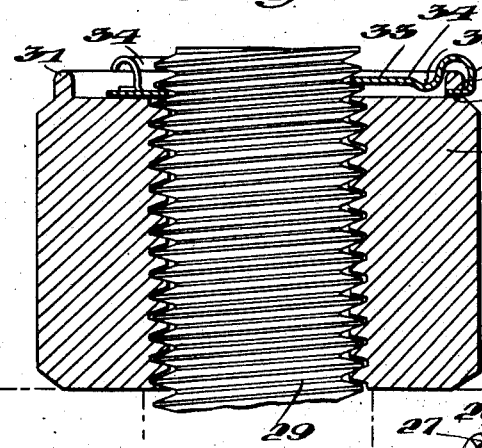
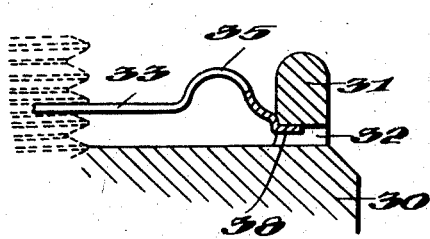
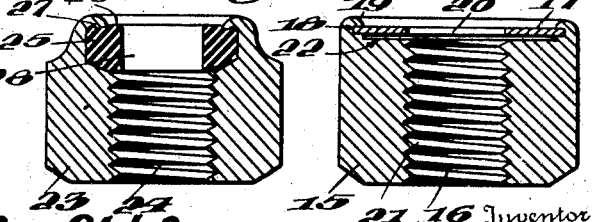
Old form
Inventor
John F. Kendrick,
By
Attorney Patented Apr. 6, 1948

2,439,253

UNITED STATES PATENT OFFICE 2,439,253

SELF-LOCKING NUT

John F. Kendrick, Elizabeth, N. J.

Application October 2, 1943, Serial No. 504,736

15 Claims. (Cl. 151—30)

This invention relates to self-locking nuts and, more particularly, to self-locking nuts of the type using bolt thread engaging washers which, when applied to the threaded shank of a bolt, exert frictional forces thereon of such nature as to maintain the nuts against undesired rotation.

In the construction of one of the most widely used locking nuts of this character, a nut body is provided which is formed at one end with a chamber in which is seated a washer of yieldable material, the washer having an opening formed therein which registers longitudinally with the threaded bolt-receiving opening provided in the nut body, the diameter of the washer opening being somewhat less than the major diameter of the bolt threads, so that as the nut is threaded on a bolt, the threads of the latter cut corresponding threads in the wall of the washer opening, and the locking action is obtained by the frictional drag of the tight fit thus provided between the washer and bolt.

While locking nuts of this category are quite widely used, a study of their cross-sectional configuration reveals that over 30% of the overall length of each thereof is utilized by the locking washer and its retaining means. It will be apparent that this reduces the length of the threaded portion of the nut and also that of its external wrench-receiving surface, simply to provide for the means to lock the nut in its working position.

It is, therefore, an important object of the present invention to provide a locking nut of the general character indicated wherein the locking washer or element is substantially reduced in thickness as compared with the yieldable washers heretofore utilized, but without in any way reducing its locking effectiveness, whereby to provide a locking nut which is mechanically stronger, within the same overall dimensions, than locking nuts of the predecessor type set forth.

Another object is to provide a locking nut having at its outer end a thin metallic locking washer, disk or element, the latter being circumferentially secured to the nut so that the washer or element occupies a plane perpendicular to the longitudinal axis of the nut, with the central region of the washer free to flex to a limited extent, the thickness of the washer being but a fractional part of the pitch of the bolt threads on which the nut is received, whereby when the nut is threaded on the bolt shank, the helix angle of the bolt threads causes resilient flexing or twisting of the material of the locking washer around its bolt opening, thus enabling the washer to exert such frictional pressures on the bolt as to preclude undesired rotation of the nut thereon.

This application is extended in continuation-in-part application, Serial No. 518,813, filed January 19, 1944, entitled "Nut or bolt lock." The continuation-in-part application, Serial No. 518,813, has been divided into divisional application, Serial No. 762,945, filed July 23, 1947, entitled "Tilting diaphragm lock nut."

With these and other objects in view, the invention consists in the novel features of construction, combinations of elements and arrangements of parts hereinafter more fully described and pointed out in the appended claims. In the drawings, forming a part of this specification, and in which similar characters of reference denote like and corresponding parts throughout the several views thereof:

Fig. 1 is a top plan view of a locking nut formed in accordance with the present invention;

Fig. 2 is a vertical sectional view taken through the nut on the plane indicated by the line II—II of Fig. 1;

Fig. 3 is an enlarged detail sectional view disclosing a slightly modified form of the nut locking element;

Fig. 4 is a plan view of another modified form of locking element;

Fig. 5 is a transverse sectional view taken on the plane disclosed by the line V—V of Fig. 4;

Fig. 6 is a plan view showing a still further modification of the locking element;

Fig. 7 is a vertical transverse sectional view on the line VII—VII of Fig. 6;

Fig. 8 is a vertical sectional view taken through a locking nut employing a plain disk-like locking element;

Fig. 9 is a similar view taken through an elastic washer or nut of standard design, the same being shown on the same scale as the locking nut illustrated in Fig. 8 for comparison purposes.

Referring more particularly to the drawings, a simple embodiment of my invention has been disclosed in Fig. 8, wherein the body 15 of the locking nut is provided with a threaded bore 16. The outer or upper end of the body 15, as it is viewed in Fig. 8, carries a metallic locking washer, disk, or element 17, the latter being retained in a fixed position in relation to the nut body by having its outer circumferential edge seated and held in an annular groove 18 formed by the crimped edge 19 of the nut body. The washer is formed with an axial opening 20, which substantially corresponds in diameter with the pitch diameter of the threads 21 of the bore 16. The washer occupies a plane substantially perpendicular to the longitudinal axis of the nut.

In general, the central and intermediate regions of the washer are spaced from the outer end surface 22 of the nut body, in order that the washer may resiliently flex or twist to, at least, a limited extent. The washer is preferably of metallic construction so that it may possess the desired degree of thinness and flexibility consistent with its intended locking function, and while many materials may be employed in its formation, I have found that alloys of beryllium, such as beryllium copper, have desirable properties. Also, in addition to metals, it is feasible to employ certain of the so-called plastics in the composition of the washer.

It will be noted that the opening in the disk or washer 17 approximates the pitch diameter of the bolt or nut threads. If the locking washer or plate is made thinner, the diameter of the opening may more nearly approximate the minor diameter of the bolt, because the thinner disk can protrude farther into the V of the thread. As the thickness of the disk is reduced, the diameter of the opening 20 should be reduced. The thicker disk will, of course, give a higher torque. An aperture diameter approximating the average of the pitch and major diameters of the externally threaded member will be satisfactory in a wide range of applications.

The improved strength of the locking washer forming the present invention, and as shown in Fig. 8, is apparent upon comparing the latter figure with the standard type of locking nut illustrated in Fig. 9. In the latter figure, the nut body is indicated at 23, the same being provided with a threaded bore 24 which, at its outer end, terminates in an annular chamber 25 in which is seated a locking washer 26, the latter being permanently secured to the nut body 23 by crimping one end of the latter as as 27 so that the outer circumferential portion of the washer 26 is firmly gripped.

The washer 26 is formed with a bolt-receiving opening 28 which has a diameter normally less than that of the major diameter of the bolt threads. The washer 26 is formed from a yieldable material, such as natural or synthetic rubber, pressed fiber or the like, so that when the nut is threaded on the shank of a bolt, the threads of the shank cut into the walls of the opening 28 in order that a tight fit is established between the bolt threads and the washer, enabling the latter to exert frictional forces on the bolt shank to preclude the accidental turning of the nut. While this construction is effective in its nut locking capacity, nevertheless, a comparison of Figs. 8 and 9 discloses that a relatively high percentage of the nut body is taken up by the locking means. Accurate measurements indicate that insofar as the height dimension is concerned, approximately 34.4% of the nut body is occupied by the locking means. It will be apparent at once that this reduces the length of the nut thread, at the expense of the strength of the nut, and also proportionately reduces external wrenching area.

It is, therefore, apparent that, from the standpoint of nut strength per unit of height or length measurement, the construction illustrated in Fig. 8 is an improvement upon that disclosed in Fig. 9, wherein the loss of thread length, due to the inclusion of the locking washer, is only 9.4%. In other words, the nut disclosed at 15 in Fig. 8 will be approximately 38% stronger than a nut of comparable dimensions having the construction illustrated in Fig. 9.

While the improvement in mechanical strength between the two constructions is obvious, it is equally important that the locking washer of Fig. 8 must exert an equivalent locking action on a bolt shank as the locking washer 26 illustrated in Fig. 9 and the present invention provides such action. In developing this action, we will consider a small piece of light gauge sheet metal, with an opening drilled or punched in it having a diameter about equal to the pitch diameter of the threads of a bolt. If the thickness of the sheet metal is some fraction of the pitch of the bolt thread, for instance one-half to one-fourth thereof, it will be possible to screw the bolt into the opening, but in order to do so, it will be necessary to incline the bolt at an angle to the sheet metal approximately equal to the helix angle of the thread of the bolt. Under such conditions, it would not be necessary to thread or tap the walls of the opening in the sheet metal. However, if the sheet metal were fixed in a plane by clamping its outer edges and the bolt constrained so that its axis is approximately perpendicular to the plane of the sheet metal, it will be necessary for the sheet metal to have enough resiliency to twist before it would be possible to secure the bolt into the opening without threading the latter. This twisting action on the part of the plate, therefore, provides a suitable means for locking the nut to a bolt, and at the same time, provides a thin washer which makes possible the employment of a stronger nut body.

In the manufacture of the smaller sizes of nuts with fine threads, a simple flat disk, such as is shown at 17, with a bolt-receiving opening in its center, and having its outer circumferential edge crimped to the body of the associated nut, will be all that is required in most cases, this being due to the small helix angle of the bolt thread. On larger sizes and for closer threads, the locking washer may be given increased resiliency, particularly in its outer region, to provide for a stronger gripping action.

Such coarser or larger threads have been illustrated on the bolt 29, depicted in Figs. 1 and 2. In the latter figures, the preferred design consists of an ordinary nut 30, on the upper or outer face of which an annular flange 31 is machined or pressed. A secondary operation is required to drill a plurality of radial holes 32, in this instance three, through the wall of this flange. These holes may be approximately 120 degrees apart although other desired arrangements may be employed. The locking washer 33, illustrated in Figs. 1 and 2, is provided with a plurality of radiating spokes 34. These spokes are each provided with a rigidity increasing concave region 35 which terminates in a resilient outer region in the form of a hook 36, the latter having an inturned tongue 37. These tongues are adapted to be positioned in the holes 32 provided in the flange 31 so that the locking washer may be maintained in its operative position in connection with the nut 30, but capable of being readily removed therefrom.

An equivalent structure has been illustrated in Fig. 3 wherein the out-turned tongues 38 may be engaged with the holes 32 formed within the confines of the flange 31. Instead of being circular, the flange 31 may conform to the configuration of the hexagonal margins of the standard nut.

In Fig. 2, the washer is shown as bearing on the under side of the upper thread of the bolt and on the upper side of the lower thread of the bolt, each for approximately half of its circumference. This is the preferred arrangement, as it reduces the angle or twist of the washer or disk, and lessens the possibility that it will vibrate in synchronism with the bolt.

In Figs. 4 and 5, a plain disk is shown at 39, the same being corrugated as at 40 between the walls of its bolt-receiving opening 41 and its outer circumferential edge.

In Figs. 6 and 7, a similar arrangement is disclosed, except that the disk 42 is provided with circumferentially disposed recesses 43, producing therebetween securing spokes 44, the latter being corrugated as at 45.

The operation of this locking element, therefore, involves the intertwining of the circular aperture of the disk or plate with the groove of the helix of the externally threaded member. It will be obvious that the crest of the external thread will cross the inside edge of the aperture in the disk or plate at some point. This necessitates some radial movement of the locking element with respect to the externally threaded member. When the diameter of the aperture is greater than the pitch diameter of the external threads, the usual manufacturing allowances will provide sufficient clearance to prevent the binding of the crest of the male thread against the inside edge of the aperture or the impressing of a portion of the thread on the inside edge of the aperture. If the diameter of the aperture is approximately equal to the pitch diameter of the external threads, some radial resiliency will be necessary in the locking element. The preferred result is the application of an axial locking force in a differential manner; that is in one axial direction on one side of the externally threaded member and in the opposite axial direction on the opposite side with neutral zones in between. The preferred design, therefore, will be to proportion the aperture so as to avoid the keying effect of impressing a portion of a thread on the inside edge of the aperture.

Consideration will disclose that the present invention provides a locking element for cooperating screw-threaded members which is formed to provide a relatively thin metallic plate or disk, the same being provided with a centrally located bolt-receiving aperture. The latter is formed with a thread-engaging edge possessing a smooth, uninterrupted annular edge, the body of the plate or disk immediately around said aperture being relatively stiff and inflexible. The diameter of the aperture approximates the pitch diameter of the threads, and the thickness of the plate is such as to permit the thread-engaging edge of the element to enter a thread groove provided at the chamfered upper end of the bolt 29. The outer portion of the locking element, around the rigid apertured central region thereof, as shown particularly in Figs. 1 to 7, inclusive, of the drawings, is provided with a rigidity-increasing rib as at 35 and an outer resiliency-affording region shown at 36 in Fig. 2, 38 in Fig. 3, and 40 in Fig. 5. In Figs. 1 and 6, the outer resilient portion of the disk consists of a plurality of integral, elastic members in the form of radial, spoke-like members or tongues. These members impart resiliency to the locking element so as to permit the thread-engaging edge region of the aperture to be tilted by the helix of the engaging thread, whereby adjacent threads of the cooperating threaded members are restrained against relative movement.

In view of the foregoing, it will be seen that my improved self-locking nuts have a number of advantages not possessed by similar nuts on the market at present. In the first place, the locking element is about as thin as possible for a built-in device, thereby making it feasible to produce a stronger nut having longer thread engagement. Next, the metallic disk can withstand moisture and a wide range of temperatures which may readily produce deterioration of yieldable materials. Further, the shape of the disk-like locking elements can be such as to make sharp bends therein unnecessary, thereby reducing the danger of failure from fatigue. Also, my locking nut can be manufactured cheaper than the common two-piece integral self-locking nuts. Finally, the locking disks can be renewed, although, as stated, their design can be modified to unite the same permanently with associated nut bodies. Another advantage resides in the fact that in the form of my invention disclosed in Figs. 1 and 2, the nut body can be heat treated to take advantage of its full tensile strength, after it has been completely machined, and then the locking disk can be inserted after the nut body has been plated.

While I have set forth several forms of my improved self-locking nut, embodiments which I now consider to be of particular importance, nevertheless, it will be understood that the constructions illustrated are subject to certain modification without departure from the essential features of the invention, or the scope of the following claims.

Having thus described my invention, I claim:

1. A combination for precluding relative rotation between cooperating internally and externally screw-threaded members, comprising said internally and externally threaded members and a thin unthreaded centrally apertured plate, the aperture of which defines a thread-engaging edge possessing a smooth uninterrupted, continuous and relatively inflexible planar form with the diameter of said aperture greater than the minor diameter and less than the major diameter of the threads of the externally threaded member, said plate being non-rotatively attached at its outer perimeter to the internally threaded member, so as to position said aperture in longitudinal registration with and at right angles to the axis of the bore of the internally threaded member, the thickness of the thread-engaging edge being such as will permit it to enter the thread-groove of the externally threaded member, deflecting the thread-engaging edge of said plate, and wedging said plate between the cooperating screw-threaded members, restraining them against relative movement.

2. A combination for precluding relative rotation between cooperating internally and externally screw-threaded members, comprising said internally and externally threaded members and a thin unthreaded centrally apertured plate, the aperture of which defines a thread-engaging edge possessing a smooth uninterrupted, continuous and relatively inflexible planar form with the diameter of said aperture greater than the minor diameter and less than the major diameter of the threads of the externally threaded member, said plate being non-rotatively attached at its outer perimeter to the internally threaded member, so as to position said aperture in longitudinal registration with and at right angles to the axis of the bore of the internally threaded member, the thickness of the thread-engaging edge being such as will permit it to enter the thread-groove of the externally threaded member for part of the circumference of the thread whereupon it crosses the crest of the thread and again reenters the thread-groove, deflecting the thread-engaging edge of said plate, and wedging said plate between the cooperating screw-threaded members, restraining them against relative movement.

3. A combination for precluding relative rotation between cooperating internally and externally screw-threaded members, comprising said internally and externally threaded members and a thin unthreaded centrally apertured plate, the aperture of which defines a thread-engaging edge possessing a smooth uninterrupted, continuous and relatively inflexible planar form with the diameter of said aperture greater than the minor diameter and less than the major diameter of the threads of the externally threaded member, said plate being non-rotatively attached at its outer perimeter to the internally threaded member, so as to position said aperture in longitudinal registration with and at right angles to the axis of the bore of the internally threaded member, the thickness of the thread-engaging edge being such as will permit it to enter the thread-groove of the externally threaded member, deflecting the thread-engaging edge of said plate, and wedging said plate between the cooperating screw-threaded members, restraining them against relative movement, the restraining force being applied axially by the thread-engaging edge to the thread of the externally threaded member and differentially in one axial direction on one side of the externally threaded member and in the opposite axial direction on the opposite side of the externally threaded member with neutral points in between.

4. A combination for precluding relative rotation between cooperating internally and externally screw-threaded members, comprising said internally and externally threaded members and a thin unthreaded apertured disk, said aperture having a smooth, uninterrupted, continuous and relatively inflexible annular-shaped planar thread-engaging edge, with the diameter of said aperture greater than the minor diameter and less than the major diameter of the threads of the externally threaded member, said disk being circumferentially formed with a corrugated cross-section around the outer circumference of the annular-shaped thread-engaging edge, so as to impart both axial and radial resilience to the thread-engaging edge, said disk being non-rotatively attached at its outer perimeter to the internally threaded member, so as to position said aperture in longitudinal registration with and at right angles to the axis of the bore of the internally threaded member, the thickness of the annular-shaped thread-engaging edge being such as will permit it to enter the thread-groove of the externally threaded member, tilting the annular-shaped thread-engaging edge of said disk, and wedging said disk between the cooperating screw-threaded members, restraining them against relative movement.

5. A combination for precluding relative rotation between cooperating internally and externally screw-threaded members, comprising said internally and externally threaded members and a thin unthreaded apertured disk, said aperture having a smooth, uninterrupted, continuous and relatively inflexible annular-shaped planar thread-engaging edge, with the diameter of said aperture greater than the minor diameter and less than the major diameter of the threads of the externally threaded member, said disk being circumferentially formed with a corrugated cross-section around the outer circumference of the annular-shaped thread-engaging edge, so as to impart both axial and radial resilience to the thread-engaging edge, said disk being non-rotatively attached at its outer perimeter to the internally threaded member, so as to position said aperture in longitudinal registration with and at right angles to the axis of the bore of the internally threaded member, the thickness of the annular-shaped thread-engaging edge being such as will permit it to enter the thread-groove of the externally threaded member, tilting the annular-shaped thread-engaging edge of said disk and wedging said disk between the cooperating screw-threaded members, restraining them against relative movement.

6. A combination for precluding relative rotation between cooperating internally and externally screw-threaded members, comprising said internally and externally threaded members and a thin unthreaded apertured disk, said aperture having a smooth, uninterrupted, continuous and relatively inflexible annular-shaped planar thread-engaging edge, with the diameter of said aperture greater than the minor diameter and less than the major diameter of the threads of the externally threaded member, said disk being circumferentially formed with a corrugated cross-section around the outer circumference of the annular-shaped thread-engaging edge, so as to impart both axial and radial resilience to the thread-engaging edge, said disk being non-rotatively attached at its outer perimeter to the internally threaded member, so as to position said aperture in longitudinal registration with and at right angles to the axis of the bore of the internally threaded member, the thickness of the annular-shaped thread-engaging edge being such as will permit it to enter the thread-groove of the externally threaded member, tilting the annular-shaped thread-engaging edge of said disk, and wedging said disk between the cooperating screw-threaded members, restraining them against relative movement, the restraining force being applied axially by the thread-engaging edge to the thread of the externally threaded member and differentially in one axial direction on one side of the externally threaded member and in the opposite axial direction on the opposite side of the externally threaded member with neutral points in between.

7. A combination for precluding relative rotation between cooperating internally and externally screw-threaded members, comprising said internally and externally threaded members and a thin unthreaded centrally apertured annular-shaped disk, the aperture of which defines a thread-engaging edge possessing a smooth uninterrupted, continuous and relatively inflexible planar form with the diameter of said aperture greater than the minor diameter and less than the major diameter of the threads of the externally threaded member, the outer portion of said disk comprising a plurality of elastic members, radially disposed and so formed as to impart axial and radial resilience to said thread-engaging edge, said disk being non-rotatively attached at the outer perimeter of said radial elastic members to the internally threaded members, so as to position said aperture in longitudinal registration with and at right angles to the axis of the bore of the internally threaded member, the thickness of the thread-engaging edge being such as will permit it to enter the thread-groove of the externally threaded member, deflecting the thread-engaging edge of said disk, and wedging said disk between the cooperating screw-threaded members, restraining them against relative movement.

8. A combination for precluding relative rotation between cooperating internally and externally screw-threaded members, comprising said internally and externally threaded members and a thin unthreaded centrally apertured annular-shaped disk, the aperture of which defines a thread-engaging edge possessing a smooth uninterrupted, continuous and relatively inflexible planar form with the diameter of said aperture greater than the minor diameter and less than the major diameter of the threads of the externally threaded member, the outer portion of said disk comprising a plurality of elastic members, radially disposed and so formed as to impart axial and radial resilience to said thread-engaging edge, said disk being non-rotatively attached at the outer perimeter of said radial elastic members to the internally threaded member, so as to position said aperture in longitudinal registration with and at right angles to the axis of the bore of the internally threaded member, the thickness of the thread-engaging edge being such as will permit it to enter the thread-groove of the externally threaded member for part of the circumference of the thread whereupon it crosses the crest of the thread and again reenters the thread-groove, tilting the annular-shaped thread-engaging edge of said disk, and wedging said disk between the cooperating screw-threaded members, restraining them against relative movement.

9. A combination for precluding relative rotation between cooperating internally and externally screw-threaded members, comprising said internally and externally threaded members and a thin unthreaded centrally apertured annular-shaped disk, the aperture of which defines a thread-engaging edge possessing a smooth uninterrupted, continuous, and relatively inflexible planar form with the diameter of said aperture greater than the minor diameter and less than the major diameter of the threads of the externally threaded member, the outer portion of said disk comprising a plurality of elastic members, radially disposed and so formed as to impart axial and radial resilience to said thread-engaging edge, said disk being non-rotatively attached at the outer perimeter of said radial elastic members to the internally threaded member, so as to position said aperture in longitudinal registration with and at right angles to the axis of the bore of the internally threaded member, the thickness of the thread-engaging edge being such as will permit it to enter the thread-groove of the externally threaded member, deflecting the thread-engaging edge of said disk and wedging said disk between the cooperating screw-threaded members, restraining them against relative movement, the restraining force being applied axially by the thread-engaging edge to the thread of the externally threaded member and differentially in one axial direction on one side of the externally threaded member and in the opposite axial direction on the opposite side of the externally threaded member with neutral points in between.

10. In a combination, a locking element comprising a nut, a mating bolt and a thin unthreaded centrally apertured disk, the aperture of which defines a thread-engaging edge possessing a smooth uninterrupted, continuous, and relatively inflexible planar form with the diameter of said aperture greater than the minor diameter and less than the major diameter of the threads of an externally threaded bolt, said disk being non-rotatively positioned in longitudinal alignment and at right angles to the bore of said nut in a counterbore, the outer end of the thin wall of said counterbore being flanged over the outer edge of said locking element, the thickness of the thread-engaging edge being such as will permit it to enter the thread-groove of a cooperating bolt, deflecting the thread-engaging edge of said disk, and wedging said disk between the nut and bolt, restraining them against relative movement.

11. In a combination, a locking element comprising a nut, a mating bolt and a thin unthreaded centrally apertured disk, the aperture of which defines a thread-engaging edge possessing a smooth uninterrupted, continuous and relatively inflexible planar form with the diameter of said aperture greater than the minor diameter and less than the major diameter of the threads of an externally threaded bolt, said disk being non-rotatively positioned in longitudinal alignment and at right angles to the bore of said nut in a counterbore in said nut by means of a plurality of projections spaced around the outer circumference of said disk engaging outwardly holes spaced radially in the wall of the counterbore of the nut, the thickness of the thread-engaging edge being such as will permit it to enter the thread-groove of a cooperating bolt, deflecting the thread-engaging edge of said disk, and wedging said disk between the nut and bolt, restraining them against relative movement.

12. In a combination, a locking element comprising a nut, a mating bolt and a thin unthreaded centrally apertured disk, the aperture of which defines a thread-engaging edge possessing a smooth uninterrupted, continuous and relatively inflexible planar form with the diameter of said aperture greater than the minor diameter and less than the major diameter of the thread of an externally threaded bolt, said disk being non-rotatively positioned in longitudinal alignment and at right angles to the bore of said nut by means of a plurality of projections spaced around its outer circumference and formed so as to engage inwardly holes spaced radially in the outside surface of the nut, the thickness of the thread-engaging edge being such as will permit it to enter the thread-groove of the cooperating bolt, deflecting the thread-engaging edge of said disk, and wedging said disk between the nut and bolt, restraining them against relative movement.

13. A locking element to apply restraining forces to retard relative rotation between cooperating internally and externally threaded members, said threads possessing the customary clearances, crests, grooves, minor, pitch and major diameters and helix angles, comprising said internally and externally threaded members and a thin, unthreaded, coaxially apertured resilient plate, the aperture of which defines a thread-engaging edge possessing an uninterrupted, continuous and circular form, the outer portion of said plate being proportioned to impart both radial and axial resilience to said thread-engaging edge, the thickness of the thread-engaging edge being such as will permit it to enter the thread-groove of the externally threaded member and being such as will permit the thread-engaging edge to be tilted axially by the helix angle of the externally threaded member, the diameter of the aperture approximating the average of the pitch and major diameters of the external thread to permit the thread-engaging edge to cross the crest of the external thread and reenter the external thread-groove, when the thread-engaging edge is deflected radially by the crest of the external thread, said plate being non-rotatively positioned in longitudinal alignment and at right angles to the axis of the internally threaded member in a counterbore, the outer end of the thin wall of said counterbore being flanged over the outer edge of said locking element, the tilted thread-engaging edge applying forces to the external threads, axially and differentially, in one axial direction on one diameter of said threads and in the opposite axial direction on the opposite diameter, with neutral zones between, said forces restraining relative rotation.

14. A locking element to apply restraining forces to retard relative rotation between cooperating internally and externally threaded members, said threads possessing the customary clearances, crests, grooves, minor, pitch and major diameters and helix angles, comprising said internally and externally threaded members and a thin, unthreaded, coaxially apertured resilient plate, the aperture of which defines a thread-engaging edge possessing an uninterrupted, continuous and circular form, the outer portion of said plate being composed of a plurality of elastic projections, radially disposed and so formed as to impart both radial and axial resilience to said thread-engaging edge, the thickness of the thread-engaging edge being such as will permit it to enter the thread-groove of the externally threaded member and being such as will permit the thread-engaging edge to be tilted axially by the helix angle of the externally threaded member, the diameter of the aperture approximating the average of the pitch and major diameters of the external thread to permit the thread-engaging edge to cross the crest of the external thread and reenter the external thread-groove, when the thread-engaging edge is deflected radially by the crest of the external thread, said elastic projections being further formed to engage outwardly holes spaced radially in the wall of a counterbore in one end of the internally threaded member to non-rotatively position said aperture in longitudinal registration with and at right angles to the axis of the internally threaded member, the tilted thread-engaging edge applying forces to the external threads, axially and differentially, in one axial direction on one diameter of said threads and in the opposite axial direction on the opposite diameter, with neutral zones between, said forces restraining relative rotation.

15. A locking element to apply restraining forces to retard relative rotation between cooperating internally and externally threaded members, said threads possessing the customary clearances, crests, grooves, minor, pitch and major diameters and helix angles, comprising said internally and externally threaded members and a thin, unthreaded, coaxially apertured resilient plate, the aperture of which defines a thread-engaging edge possessing an uninterrupted, continuous and circular form, the outer portion of said plate being composed of a plurality of elastic projections, radially disposed and so formed as to impart both radial and axial resilience to said thread-engaging edge, the thickness of the thread-engaging edge being such as will permit it to enter the thread-groove of the externally threaded member and being such as will permit the thread-engaging edge to be tilted axially by the helix angle of the externally threaded member, the diameter of the aperture approximating the average of the pitch and major diameters of the external thread to permit the thread-engaging edge to cross the crest of the external thread and reenter the external thread-groove, when the thread-engaging edge is deflected radially by the crest of the external thread, said elastic projections being further formed to engage inwardly holes spaced radially in the wall of a counterbore in one end of the internally threaded member to non-rotatively position said aperture in longitudinal registration with and at right angles to the axis of the internally threaded member, the tilted thread-engaging edge applying forces to the external threads, axially and differentially, in one axial direction on one diameter of said threads and in the opposite axial direction on the opposite diameter, with neutral zones between, said forces restraining relative rotation.

JOHN F. KENDRICK.

REFERENCES CITED

The following references are of record in the file of this patent:

UNITED STATES PATENTS

| Number | Name | Date |
|---|---|---|
| 1,550,282 | Rennerfelt | Aug. 18, 1925 |
| 1,726,628 | Rennerfelt | Sept. 3, 1929 |
| 1,729,013 | Rennerfelt | Sept. 24, 1929 |
| 1,791,017 | Sundh | Feb. 3, 1931 |
| 2,222,460 | Crowley | Nov. 19, 1940 |
| 2,281,056 | Timmerman | Apr. 28, 1942 |
| 2,318,398 | Hungerford | May 4, 1943 |
| 2,374,241 | Simmonds | Apr. 24, 1945 |
| 2,375,325 | Robertson | May 8, 1945 |

FOREIGN PATENTS

| Number | Country | Date |
|---|---|---|
| 538,497 | Great Britain | Aug. 6, 1941 |
| 558,414 | Great Britain | Jan. 4, 1944 |
| 698,449 | France | Nov. 18, 1930 |